United States Patent [19]
Yokomizo

[11] Patent Number: 5,768,599
[45] Date of Patent: Jun. 16, 1998

[54] INTERRUPT MANAGING SYSTEM FOR REAL-TIME OPERATING SYSTEM

[75] Inventor: Takashi Yokomizo, Tokyo, Japan

[73] Assignee: NEC Corporation, Tokyo, Japan

[21] Appl. No.: 607,461

[22] Filed: Feb. 27, 1996

[30] Foreign Application Priority Data

Feb. 28, 1995 [JP] Japan .................................. 7-040228

[51] Int. Cl.$^6$ ...................................................... G06F 13/24
[52] U.S. Cl. .......................... 395/733; 395/734; 395/735; 395/738; 395/868; 395/869
[58] Field of Search ........................ 395/733, 734, 395/735, 868, 869, 737, 738–742

[56] References Cited

U.S. PATENT DOCUMENTS

| | | | |
|---|---|---|---|
| 5,214,650 | 5/1993 | Renner et al. | 370/276 |
| 5,448,743 | 9/1995 | Gulick et al. | 395/869 |
| 5,566,334 | 10/1996 | Loader | 395/733 |
| 5,619,706 | 4/1997 | Young | 395/733 |

FOREIGN PATENT DOCUMENTS 2-220138   9/1990   Japan .

*Primary Examiner*—Jack B. Harvey
*Assistant Examiner*—Ario Etienne
*Attorney, Agent, or Firm*—Foley & Lardner

[57] ABSTRACT

An interrupt managing system for a computer system in which resources are managed by a real-time operating system. The interrupt managing system has managed interrupt storage unit in which information regarding interrupts to be managed by the real-time operating system is stored, interrupt disabling processing unit for reading out the information stored in the managed interrupt storage unit and disabling an interrupt designated by the information in order to perform exclusive control needed for system call processing, and interrupt enabling processing unit for enabling the disabled interrupt. According to the interrupt managing system, an asynchronous interrupt which does not have an influence on the resource management by an OS is enabled even during a system call processing and an interrupt which does not issue a system call can be processed without any delay.

10 Claims, 11 Drawing Sheets

INTERRUPT MANAGING SYSTEM FOR REAL-TIME OPERATING SYSTEM

BACKGROUND OF THE INVENTION

1. Field of the Invention

This invention relates to an interrupt managing system for a real-time operating system (real-time OS).

2. Description of the Prior Art

In a computer system wherein resources and processes are controlled by a real-time OS, also interrupt processing for an asynchronous interrupt which may be generated by various factors is managed by the real-time OS. A software routine for executing interrupt processing is normally called an interrupt handler. In a conventional computer system which is controlled by a real-time OS, in order to allow a system call to the OS to be issued from all interrupt handlers, it is common for the real-time OS to manage all interrupts collectively. The system call signifies an instruction issued by a task or an interrupt handler in order to request a service provided by the OS.

FIG. 1 shows a conventional computer system controlled by a real-time OS. To a CPU (Central Processing Unit) 51, an interrupt controller 50 which transmits generation of an interrupt event to the CPU 51 and a main storage 40 are connected. An interrupt A from an interrupt factor 48 and another interrupt B from another interrupt factor 49 are inputted to the interrupt controller 50. An OS 45 is resident in the main storage 40, and a routine 41 of a task A, another routine 42 of another task B, an interrupt handler 44 which starts in accordance with the occurence of the interrupt A and another interrupt handler 43 which starts in accordance with the occurence of the interrupt B are stored in the main storage 40. It is assumed that, among them, the interrupt handler 44 corresponding to the interrupt A executes its software routine to issue a system call to the OS 45, but the interrupt handler 43 corresponding to the interrupt B does not issue a system call in its software routine. Further, the OS 45 includes, in the inside thereof, interrupt disabling processing means 46 for putting the CPU 51 into an interrupt disabling condition, and interrupt enabling processing means 47 for putting the CPU 51 into an interrupt enabling condition.

By the way, some system call processing routines executed by the OS in response to generation of a system call necessitate exclusive control in order to prevent such conflict of resources that the same resource is handled in response to system calls generated from different interrupt handlers. The exclusive control is realized by setting a particular interval of the system call processing routine as interrupt disabling interval and inhibiting acceptance of any interrupt by the CPU 51 during execution of the routine within the interrupt inhibition interval.

The interrupt processing of the above computer system is described below with reference to FIG. 2. Here, description is given of the case wherein a system call to the OS 45 is issued by the task A during execution of the task A and then, within an interrupt disabling interval in the system call processing, the interrupt A is inputted from the interrupt factor 48 to the interrupt controller 50 and then the interrupt B is inputted from the interrupt factor 49 to the interrupt controller 50. In FIG. 2, each routine being executed by the CPU 51 is indicated by a thick line. Further, EI (enabling interrupt) represents an interrupt enabling interval, and DI (disabling interrupt) represents an interrupt disabling interval.

It is assumed that, during execution of the routine 41 of the task A while the CPU 51 is in an interrupt enabling condition, a system call to the OS 45 is issued at time 52. As a result, the processing by the CPU 51 passes into the OS 45, by which system call processing is thereafter performed. In order to perform such exclusive processing as described above in the processing in the OS 45, interrupt disabling processing is executed at time 53 by the interrupt disabling processing means 46. Consequently, an interruption disabling interval is started. The interrupt disabling processing is performed, for example, by executing an interrupt disabling instruction (e.g., "DI" instruction of some kinds of CPUs) of the CPU 51.

Here, if the interrupt A (indicated as "INT A") from the interrupt factor 48 is inputted to the interrupt controller 50 at time 54 within the interrupt disabling interval in the system call processing, the interrupt controller 50 outputs an interrupt request to the CPU 51. However, since the CPU 51 is within the interrupt disabling interval, the CPU 51 does not transfer the processing to the interrupt handler 44 but continues to execute the system call processing. Further, if the interrupt B (indicated as "INT B") is inputted from the interrupt factor 49, which is another interrupt factor, at time 55 within the interrupt disabling interval, then the processing of the interrupt handler is held similarly as in the case of the interrupt A. The interrupt handler 43 does not generate a system call in the inside thereof at all, and even if processing by the interrupt handler 43 is executed during the system call processing, no conflict occurs with the resources managed by the OS 45. Here, however, the interrupt processing by the interrupt handler 43 is held by the OS 45.

After the processing for which exclusive control is required in the system call processing comes to an end, interrupt enabling processing is executed by the interrupt enabling processing means 47. Here, it is assumed that the interrupt inhibiting processing comes to an end and an interrupt enabling interval is started at time 56. Consequently, the interrupt handler 44 is executed only after the interrupt enabling processing is started, and the interrupt handler 43 is executed after completion of processing of the interrupt handler 44. The interrupt enabling processing is performed, for example, by executing an interrupt enabling instruction (e.g., "EI" instruction) of the CPU 51.

After all, the processing when an asynchronous interrupt event occurs in the present system is performed in such a manner as illustrated in FIG. 3. In particular, the processing branches at step S15 depending upon whether the condition of the CPU 51 is the interrupt enabling condition (EI) or the interrupt disabling condition (DI). If the condition of the CPU 51 is the interrupt enabling condition, then the processing is transferred to a corresponding interrupt handler (step S16), and then, after the processing of the interrupt handler comes to an end, the processing returns to that executed prior to the interrupt (step S17), thereby completing the series of processes. On the other hand, if the condition of the CPU 51 is the interrupt disabling condition at step S15, interrupt handler processing is held until the interrupt enabling condition is entered subsequently (step S18). Then, after the interrupt enabling condition is entered, the processing advances to step S16 described above.

In the interrupt managing method by the conventional real-time OS described above, the OS collectively performs enabling/disabling processing for all interrupt factors. In particular, within an interrupt disabling interval, all interrupts are rejected. Consequently, a limitation by an interrupt disabling time arising from the OS exists equally to all interrupt factors, which is one of the obstacles to an improvement in operation efficiency of the system. Further, this limitation makes an obstacle to implement a real-time OS into a system in which an interrupt for which no delay of the interrupt processing is allowed is present or another system in which a timer interrupt in a period shorter than a maximum value of the interrupt disabling time prescribed by the real-time OS is present. Thus the limitation is a cause of narrowing the range in application of the real-time OS.

Further, Japanese Patent Laid-Open Application No. Hei-2-220138 (JP. A. 2-220138), now abandoned, discloses a different technique wherein, when a system call is issued within a system call disabling interval in processing of an interrupt handler by an external interrupt, that is, within a software interrupt disabling interval, the system call processing is delayed until the system call disabling interval comes to an end, giving priority to the interrupt processing. With this technique, however, since an interrupt takes precedence over a system call only within a system call disabling interval explicitly designated in an interrupt handler, a limitation by an interrupt disabling time still exits.

SUMMARY OF THE INVENTION

It is an object of the present invention to provide an interrupt managing system wherein an interrupt which does not have an influence on the resource management by an OS is enabled even during a system call processing and an interrupt which does not issue a system call can be processed without any delay.

According to the present invention, the above object is achieved by an interrupt managing system for a computer system which includes a CPU and wherein resources are managed by a real-time operating system and an asynchronous interrupt to the CPU occurs, the interrupt managing system comprises managed interrupt storage means in which information regarding interrupts to be managed by the real-time operating system is stored, interrupt disabling processing means for reading out the information stored in the managed interrupt storage means and disabling an interrupt designated by the information in order to perform exclusive control regarding processing in the real-time operating system, and interrupt enabling processing means for enabling the disabled interrupt.

In the present invention, from among interrupts which are generated asynchronously, information of only those which issue a system call to the OS in a corresponding interrupt handler is stored into the managed interrupt storage means to manage those interrupts by the OS. Accordingly, any interrupt which does not directly relate to operation of the OS such as an interrupt in whose corresponding interrupt handler no system call is issued is not influenced by the OS at all, and consequently, processing relating to the interrupt can be performed without any delay. On the other hand, for any interrupt in whose corresponding interrupt handler a system call to the OS is issued, the same operation as in conventional systems is secured.

The above and other objects, features and advantages of the present invention will be apparent from the following description referring to the accompanying drawings which illustrate examples of preferred embodiments of the present invention.

DESCRIPTION OF THE PREFERRED EMBODIMENTS

First Embodiment

Figure 1:
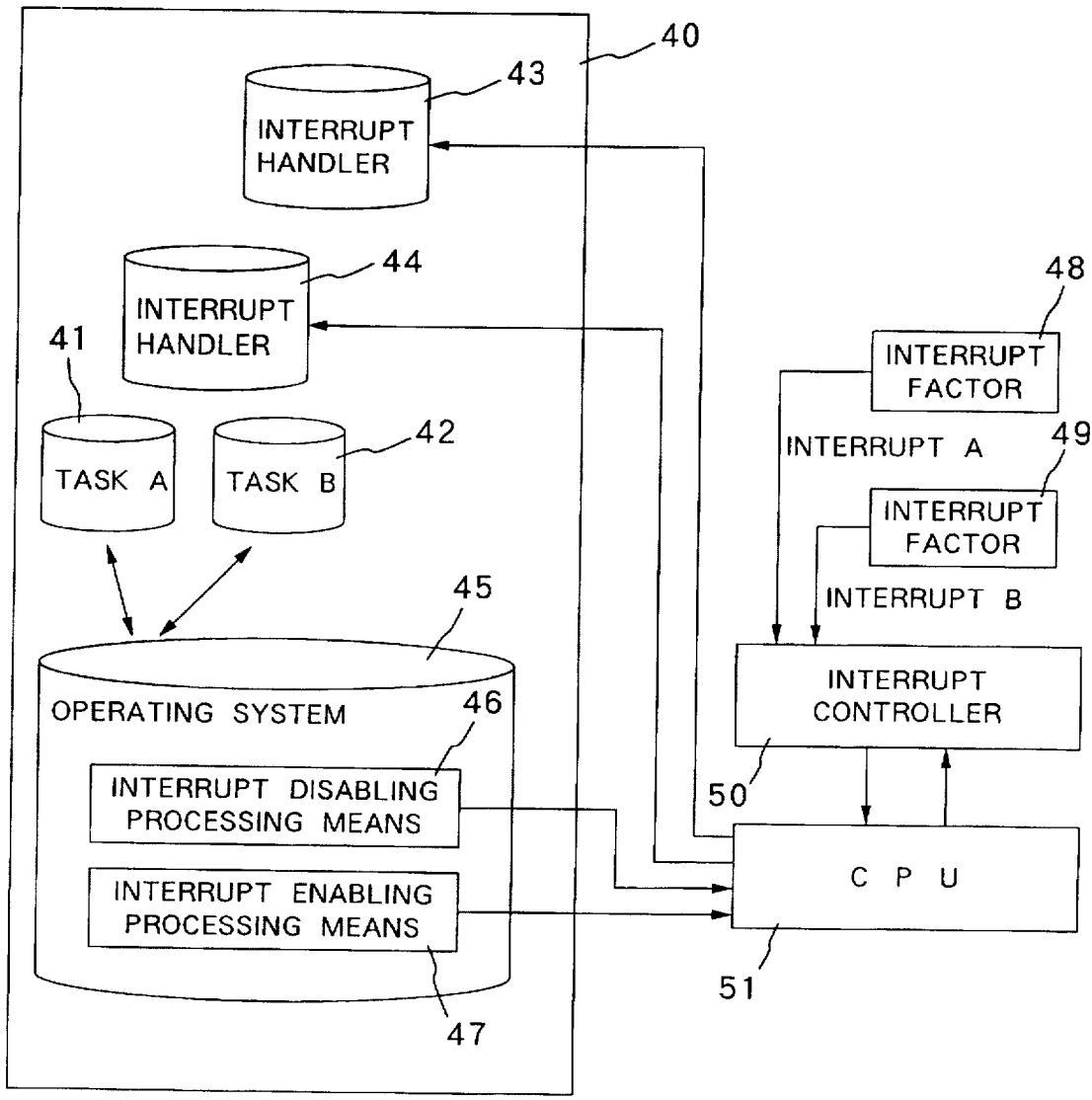
FIG. 1 is a block diagram showing the construction of a conventional computer system controlled by a typical real-time OS.
Figure 2:
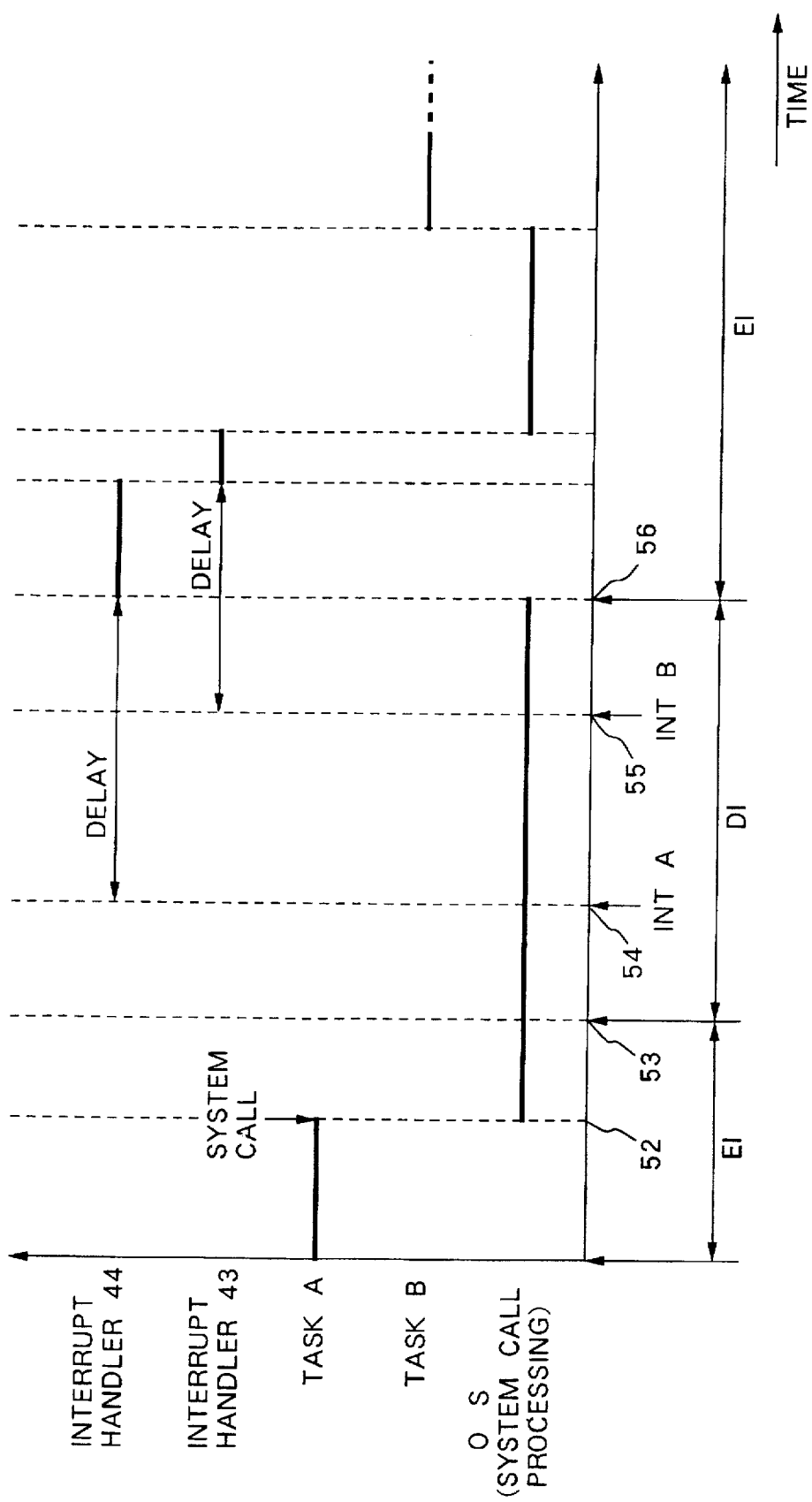
FIG. 2 is a timing chart illustrating processing in the computer system shown in FIG. 1 when interrupts successively occur.
Figure 3:
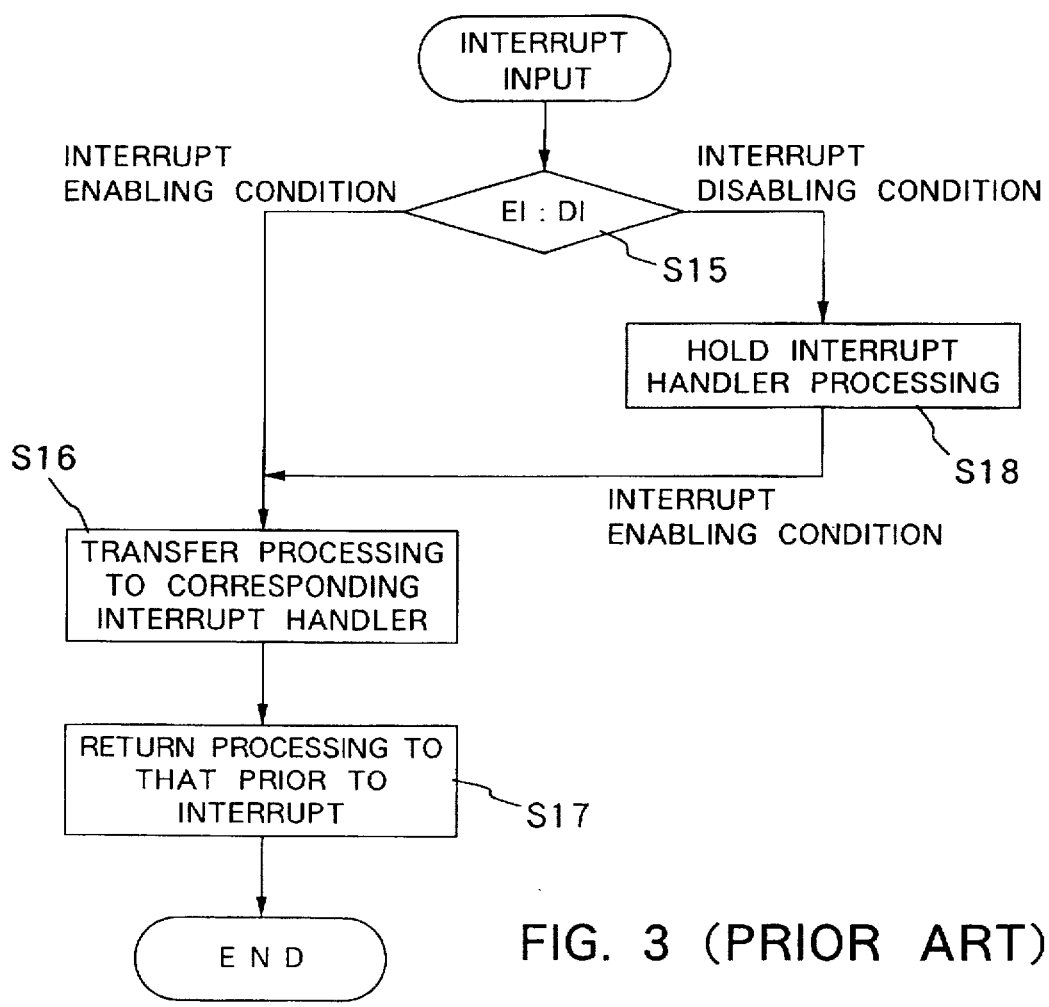
FIG. 3 is a flow chart illustrating processing by the computer system shown in FIG. 1 when an interrupt occurs.
Figure 4:
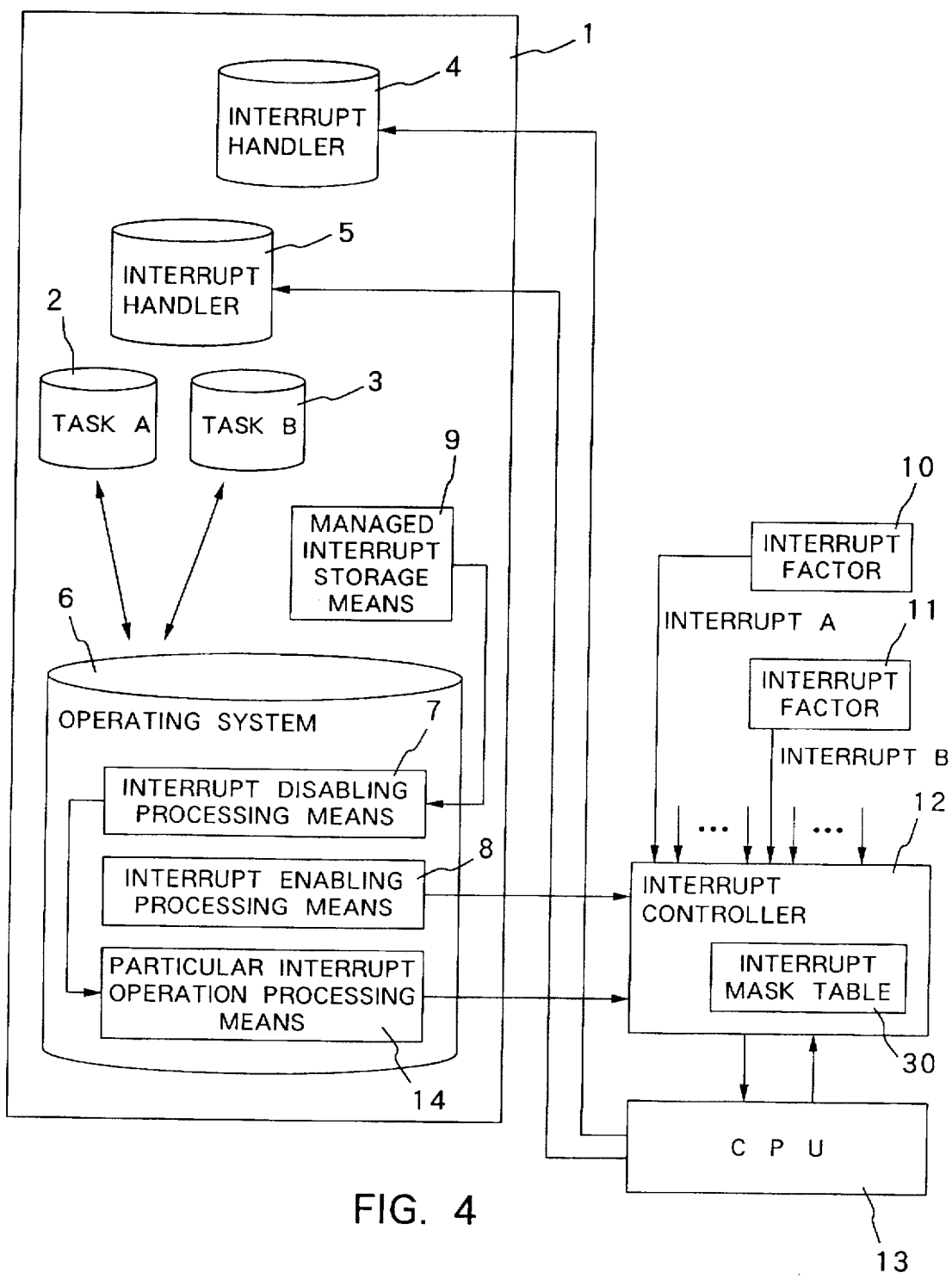
FIG. 4 is a block diagram showing the construction of a computer system to which an interrupt managing method of a first embodiment of the present invention is applied.

FIG. 4 shows a computer system to which a first embodiment of the present invention is applied. To a CPU 13, an interrupt controller 12 for transmitting occurrence of an interrupt to the CPU 13 and a main storage 1 are connected. In the present embodiment, it is assumed that the number of interrupt inputs which can be accepted by the interrupt controller 12 is sixteen (16) and the interrupt numbers from 0 to 15 are allocated to the respective interrupt inputs. Further, the interrupt controller 12 includes an interrupt mask table 30 for masking interrupts individually for the interrupt inputs, and when an input is received at one of those interrupt inputs which are not masked by the interrupt mask table 30, the interrupt controller 12 transmits occurrence of an interrupt to the CPU 13. A real-time OS 6 is resident in the main storage 1, and routines of tasks, routines of interrupt handlers are loaded into the main storage 1. Further, managed interrupt storage means 9 for storing interrupt numbers managed by the OS 6 is provided within the main storage 1. Here, an interrupt A from an interrupt factor 10 and another interrupt B from another interrupt factor 11 are inputted to the interrupt controller 12. A routine 3 of a task A and another routine 4 of another task B are loaded as routines of tasks in the main storage 1, and an interrupt handler 4 started by the interrupt A and another interrupt handler 5 started by the interrupt B are loaded as interrupt handlers in the main storage 1. The managed interrupt storage means 9 is realized as a storage area which is referred to by the OS 6.

The OS 6 includes, in the inside thereof, interrupt disabling processing means 7 for inhibiting an interrupt of a particular interrupt number in order to perform exclusive control in system call processing, interrupt enabling processing means 8 for putting the CPU 13 into an interrupt enabling condition, and particular interrupt operation processing means 14 for preventing acceptance by the CPU 13 of a particular one of interrupts disabled by the interrupt disabling processing means 7. More particularly, the interrupt disabling processing means 7 is a routine which is called to disable an interrupt and reads out interrupt numbers from the managed interrupt storage means 9. The interrupt enabling processing means 8 is a routine which manipulates the interrupt mask table 30 of the interrupt controller 12 via the CPU 13 and enables all interrupts. Meanwhile, the particular interrupt operation processing means 14 is a routine which performs writing into the interrupt mask table 30 of the interrupt controller 12 via the CPU 13 so that only interrupts of interrupt numbers read out from the managed interrupt storage means 9 by the interrupt disabling processing means 7 may be inhibited.

In the computer system of the present embodiment, interrupts inputted to the system are classified into two types. These are type I: interrupt which issues a system call to the OS 6 in an interrupt handler corresponding to the interrupt, and type II: interrupt which does not issue a system call in an interrupt handler corresponding to the interrupt. An interrupt of the type I is an interrupt for which management of enabling/disabling of the interrupt by the OS 6 is required, and the corresponding interrupt number is stored into the managed interrupt storage means 9. On the other hand, an interrupt of the type II does not issue a system call, and accordingly, enabling/disabling of the interrupt is not performed by the OS 6. The corresponding interrupt number is not stored in the managed interrupt storage means 9.

Here, it is assumed that the interrupts of the interrupt numbers 0 to 7 are of the type I and the interrupts of the interrupt numbers 8 to 15 are of the type II. The interrupt numbers 0 to 7 are stored in the managed interrupt storage means 9. Further, it is assumed that the interrupt A from the interrupt factor 10 is an interrupt of the type I whereas the interrupt B from the interrupt factor 11 is an interrupt of the type II. Accordingly, the interrupt handler 4 issues a system call in the inside of the routine thereof whereas the interrupt handler 5 does not issue a system call.

Figure 5:
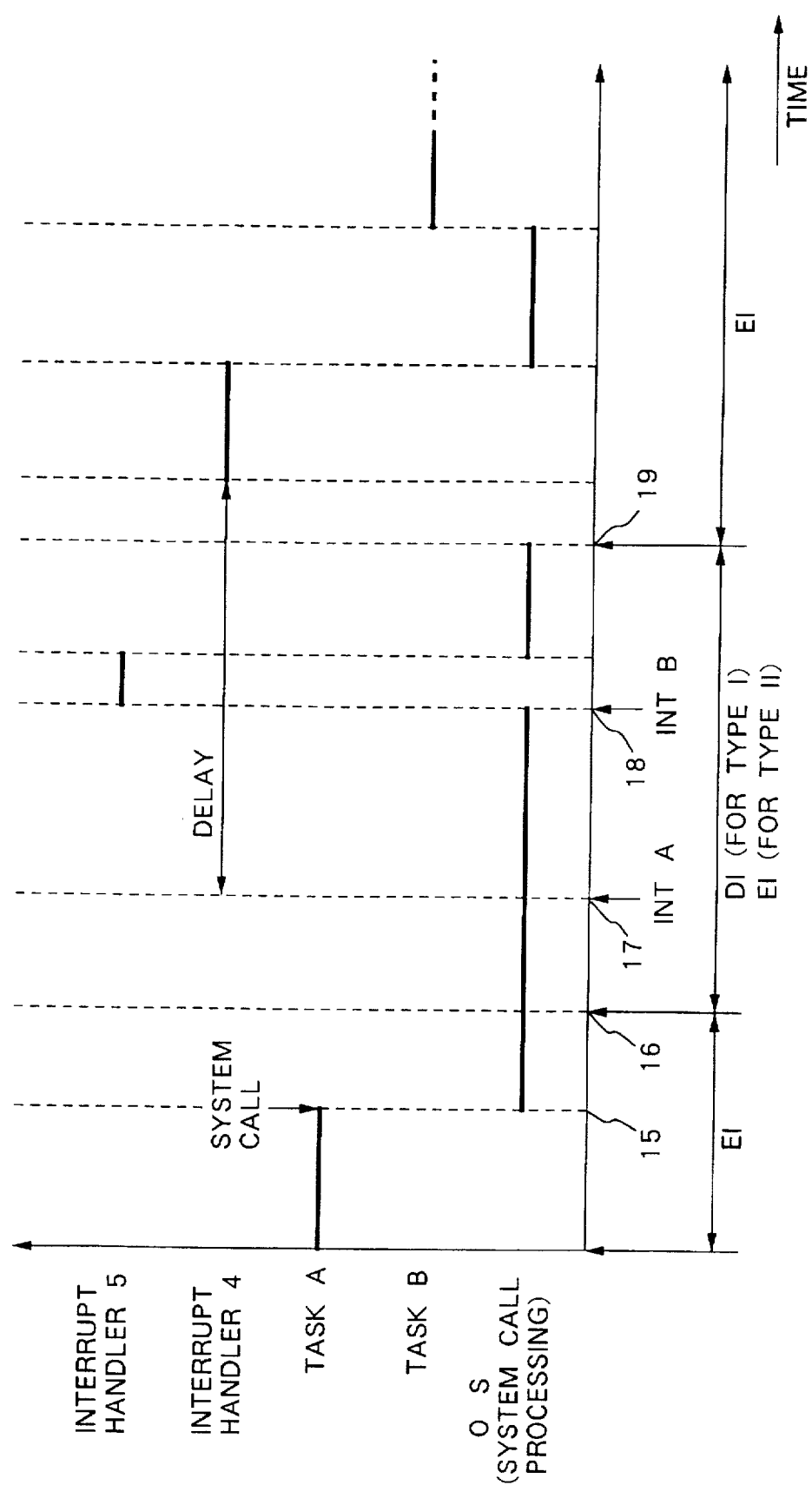
FIG. 5 is a timing chart illustrating processing by the computer system of the first embodiment when interrupts successively occur.

Now, the interrupt processing by the computer system is described with reference to FIG. 5. Here, description is given of the case wherein a system call to the OS 6 is issued by the task A during execution of the task A and, within the interrupt disabling interval in the system call processing, the interrupt A is inputted to the interrupt controller 12 from the interrupt factor 10 and then the interrupt B is inputted to the interrupt controller 12 from the interrupt factor 11. In FIG. 5, each thick line represents a routine being executed by the CPU 13. Further, EI (enabling interrupt) represents an interrupt enabling interval, and DI (disabling interrupt) represents an interrupt disabling interval.

It is assumed that, during execution of the routine 2 of the task A while the CPU 13 is in the interrupt enabling condition for all interrupts, a system call to the OS 6 is issued at time 15. As a result, the processing by the CPU 13 is transferred from the task A into the OS 6, by which system call processing is performed. During the system call processing, since disabling of any interrupt must be performed within an interval within which exclusive control for the resources is required, the interrupt disabling processing means 7 is called at time 16. The interrupt disabling processing means 7 reads out the interrupt numbers stored in the managed interrupt storage means 9 and outputs the interrupt numbers thus read out as interrupts to be disabled to the particular interrupt operation processing means 14. The particular interrupt operation processing means 14 operates the interrupt mask table 30 of the interrupt controller 12 so that only an interrupt of the type I may not be accepted. Consequently, any interrupt of the type I, that is, the interrupt A by the interrupt factor 10, is inhibited. In this instance, an interrupt of the type II is not disabled.

Here, it is assumed that the interrupt A (indicated as "INT A") from the interrupt factor 10 occurs at time 17 within the interrupt disabling period in the system call processing. Here, since interrupt disabling is set for the interrupt A, the interrupt controller 12 holds the interrupt A. Accordingly, the processing of the CPU 13 does not pass to the interrupt handler 4.

It is assumed that the interrupt B (indicated as "INT B") from the interrupt factor 11 is subsequently generated at time 18 within the interrupt disabling interval. As described above, the interrupt B does not issue a system call in the corresponding interrupt handler 5 and is excepted from the object of management by the OS 6 and accordingly is enabled. Therefore, the interrupt B suspends the system call processing without being influenced by the OS 6 and the interrupt handler 5 is started immediately.

After completion of the processing of the interrupt handler 5, the processing passes back to the suspended system call processing, and an interrupt of the type I is enabled by the interrupt enabling processing means 8 at time 19. As a result, the interrupt A held formerly is accepted, and the processing is transferred to the interrupt handler 4.

Figure 6:
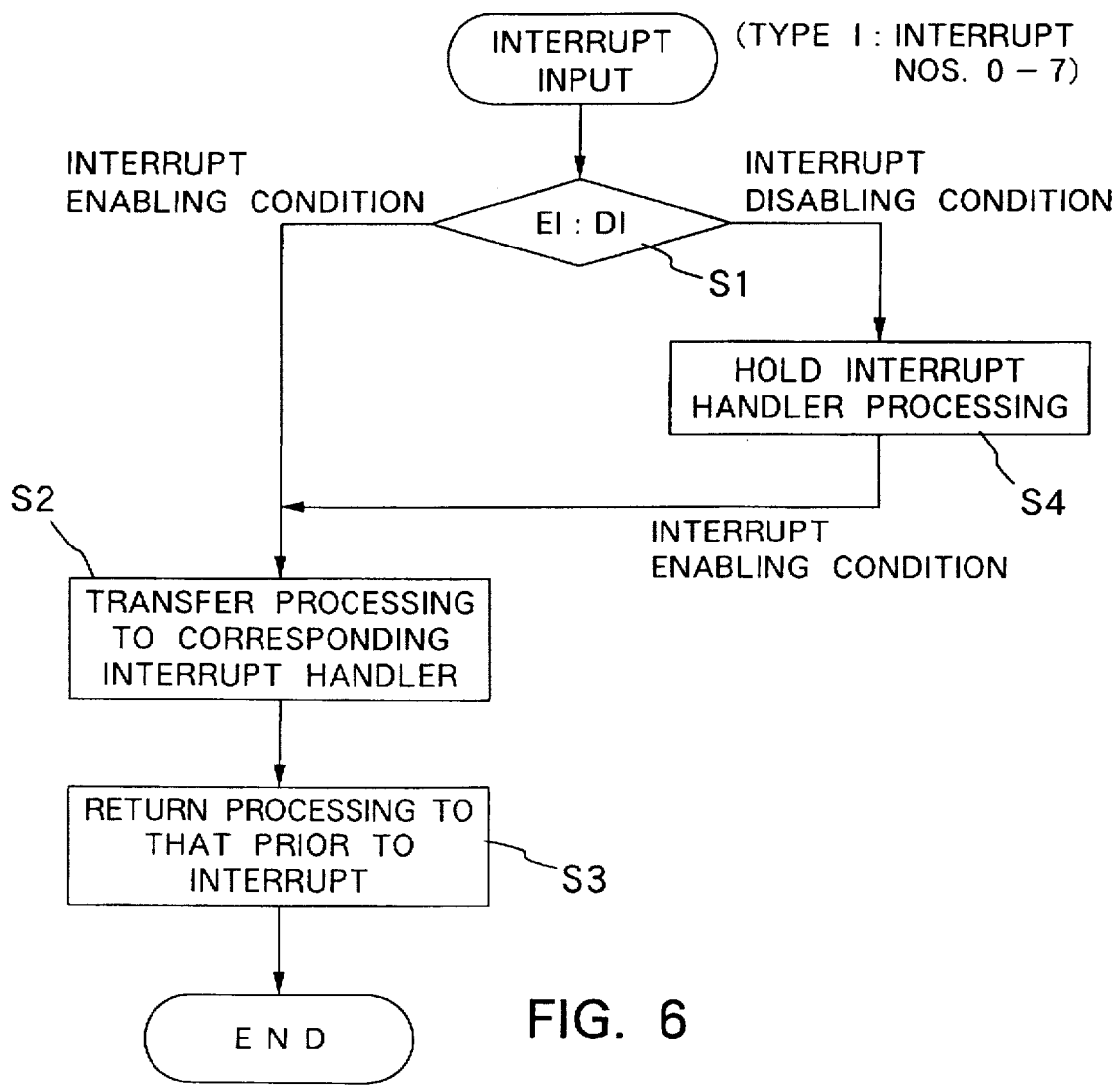
FIG. 6 is a flow chart illustrating processing by the computer system of the first embodiment when an interrupt occurs.

FIG. 6 is a flow chart illustrating processing when an interrupt of the type I occurs. If an interrupt of the type I is inputted, then the processing branches at step S1 depending upon whether the CPU 13 is in the interrupt enabling condition (EI) or the interrupt disabling condition (DI). If the CPU 13 is in the interrupt enabling condition, that is, the interrupt is not masked at the interrupt mask table 30, then the processing passes to a corresponding interrupt handler (step S2), and then after the processing of the interrupt handler comes to an end, the processing returns to the processing which has been executed prior to the interrupt (step S3), thereby completing a series of processes. On the other hand, if the CPU 13 is in the interrupt disabling condition, that is, the interrupt is masked by the interrupt mask table 30, then the interrupt handler processing is held until the interrupt enabling condition is entered again (step S4). After the interrupt enabling condition is entered again, the processing advances to step S2 described above. After all, similar processing to that performed using the conventional interrupt managing method is performed.

Figure 7:
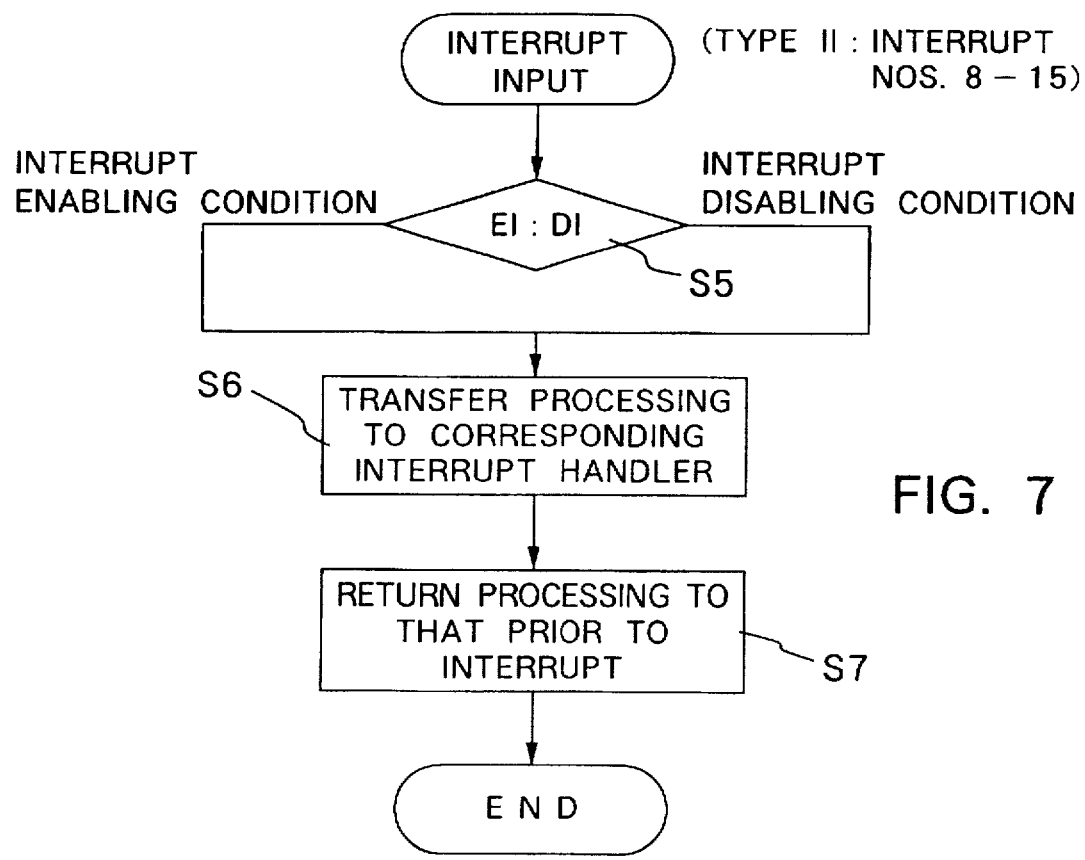
FIG. 7 is a flow chart illustrating processing by the computer system of the first embodiment when another interrupt occurs.

On the other hand, FIG. 7 is a flow chart illustrating processing when an interrupt of the type II occurs. If an interrupt of the type II is inputted, then branching of the processing depending upon whether the CPU 13 is in the interrupt enabling condition (EI) or the interrupt disabling condition (DI) does not occur as seen from step S5. Then, in any case, the processing is transferred to a corresponding interrupt handler at step S6. Then, after the processing of the interrupt handler comes to an end, the processing returns to the processing which has been performed prior to the interrupt (step S7), thereby completing a series of processes. After all, the interrupt processing is executed without being influenced by the OS.

In this manner, in the computer system which employs the interrupt managing method of the present embodiment, interrupt processing for which high emergency is required can be executed immediately without being influenced by the OS if it does not issue a system call to the OS. Accordingly, a real-time OS can be implemented into fields into which implementation is obstructed in conventional processing because the interrupt disabling time by an OS is long. Further, when it is required to issue a system call to the OS from within an interrupt handler, quite similar processing to conventional processing is performed, and consequently, the compatibility with conventional systems is maintained.

Second Embodiment

Figure 8:
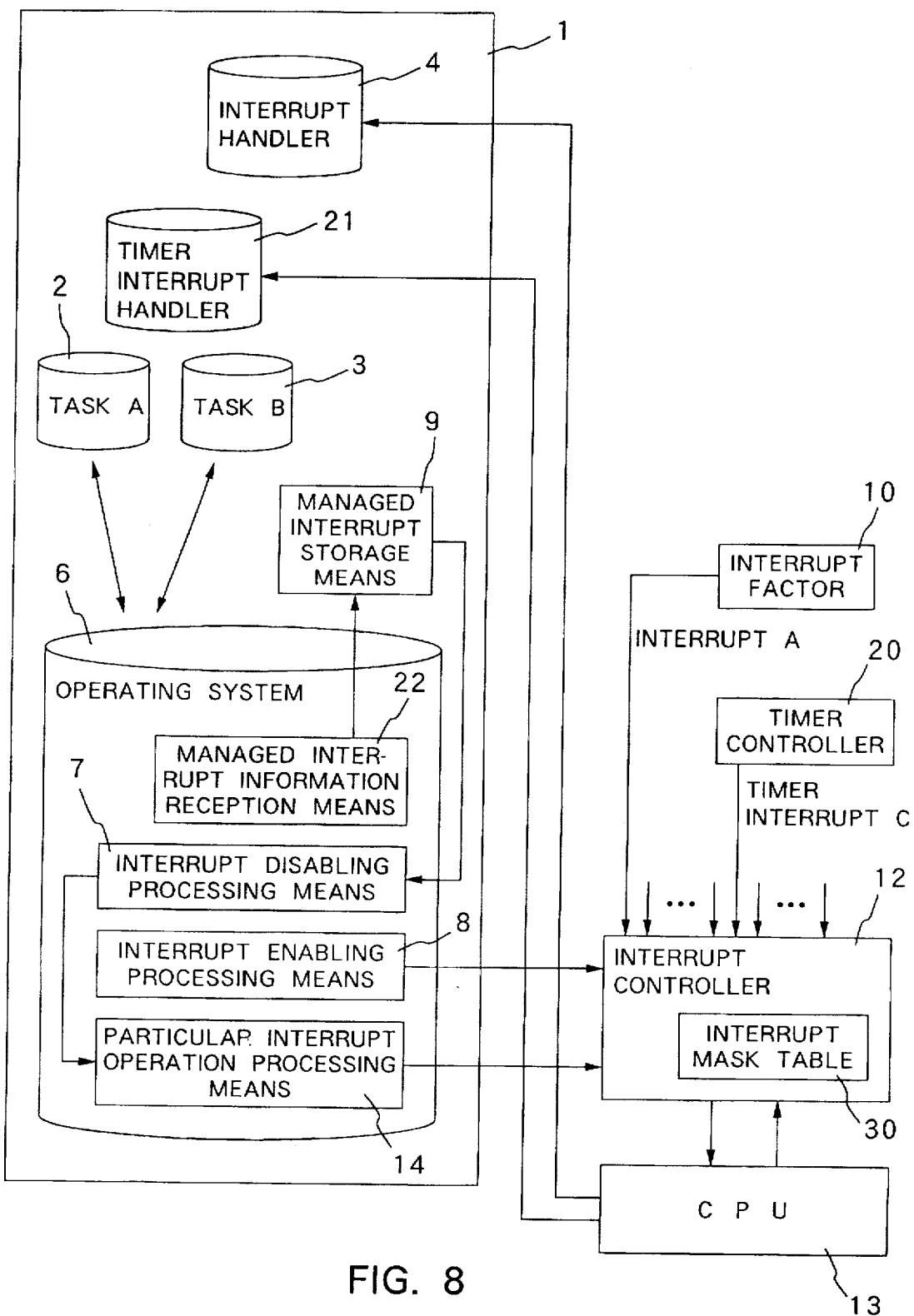
FIG. 8 is a block diagram showing the construction of a computer system to which an interrupt managing method of a second embodiment of the present invention is applied.
Figure 9:
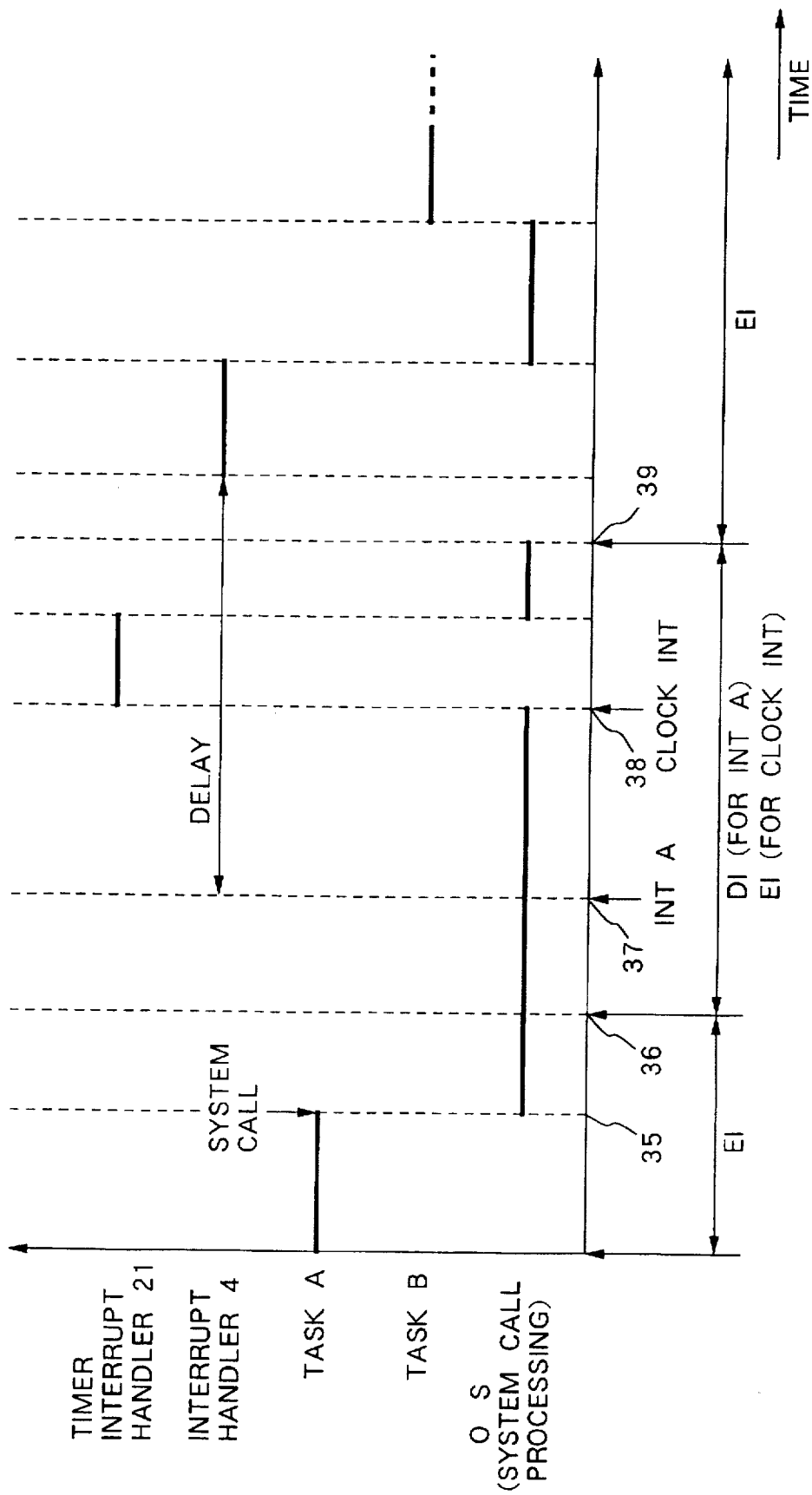
FIG. 9 is a timing chart illustrating processing by the computer system of the second embodiment when interrupts successively occur.

FIG. 8 shows a computer system to which a second embodiment of the present invention is applied. The computer system of the second embodiment is similar to the computer system of the first embodiment, but is different in that it includes a timer controller 20 which generates a timer interrupt C in place of the interrupt factor which outputs the interrupt B, and a timer interrupt handler 21 is prepared in place of the interrupt handler 5 in the main storage 1 and managed interrupt information reception means 22 is provided in the OS 6. The timer interrupt handler 21 is an interrupt handler whose interrupt factor is the timer interrupt C from the timer controller 20, and does not issue a system call to the OS 6 and executes interrupt processing for which no delay is allowed. Meanwhile, the managed interrupt information reception means 22 receives information of an interrupt to be managed by the OS 6 from an application program and stores a corresponding interrupt number into the managed interrupt storage means 9.

Next, the processing by the computer system is described with reference to FIG. 5. Here, it is assumed that the interrupt handler A corresponding to the interrupt A issues a system call.

First, as setting of the OS 6 upon initialization, only the interrupt A is set to be managed by the OS 6. This is because, in the application program, a system call to the OS 6 is issued only from within an interrupt handler 2 which is started in response to the interrupt A. This setting can be modified by the application program. The OS 6 receives, upon initialization, information to be stored into the managed interrupt storage means 9 from the application program by the managed interrupt information reception means 22. Here, the interrupt number corresponding to the interrupt A is received and stored into the managed interrupt storage means 9.

In the following, description is given of the case wherein, after registration into the managed interrupt storage means 9 is performed in this manner, a system call to the OS 6 is issued by the task A during execution of the task A, and the interrupt A is inputted from the interrupt factor 10 to the interrupt controller 12 and then the timer interrupt C occurs within the interrupt disabling interval in the system call processing.

It is assumed that the CPU 13 is in the interrupt enabling condition for all interrupts, and during execution of the routine 2 of the task A, a system call to the OS 6 is issued at time 35. As a result, the processing by the CPU 13 is transferred into the OS 6, by which system call processing is performed. During the system call processing, since interrupt must be disabled within an interval within which exclusive control of the resources is required, the interrupt disabling processing means 7 is called at time 36. The interrupt disabling processing means 7 reads out the interrupt numbers stored in the managed interrupt storage means 9. Since only the interrupt number corresponding to the interrupt A is stored in the managed interrupt storage means 9 as a result of setting of the OS 6 upon initialization, only this interrupt number is transferred to the particular interrupt operation processing means 14. The particular interrupt operation processing means 14 operates the interrupt mask table 30 of the interrupt controller 12 based on the thus transferred interrupt number so that only the interrupt A is disabled.

Here, it is assumed that the interrupt A (indicated as "INT A") from the interrupt factor 10 is inputted at time 37 within the interrupt disabling interval in the system call processing. Since the interrupt disabling for the interrupt A is set, the interrupt controller 12 holds the interrupt A. Accordingly, the processing of the CPU 13 does not is not transferred to the interrupt handler 4.

Then, it is assumed that the timer interrupt C (indicated as "CLOCK INT") is generated by the timer controller 20 at time 38 within the interrupt disabling interval. Since the timer interrupt C is not placed under the management of the OS 6 as a result of setting of the OS 6 upon initialization, the timer interrupt C is enabled. Consequently, even when the CPU 13 is within the interrupt disabling interval, the system call processing is suspended by the timer interrupt C and the timer interrupt handler 21 is started immediately.

After completion of the processing of the timer interrupt handler 21, the processing returns to the interrupted system call processing, and at time 39, the interrupt A is enabled by the interrupt enabling processing means 8. As a result, the interrupt A held precedently is accepted, and the processing passes to the interrupt handler 4.

Figure 10:
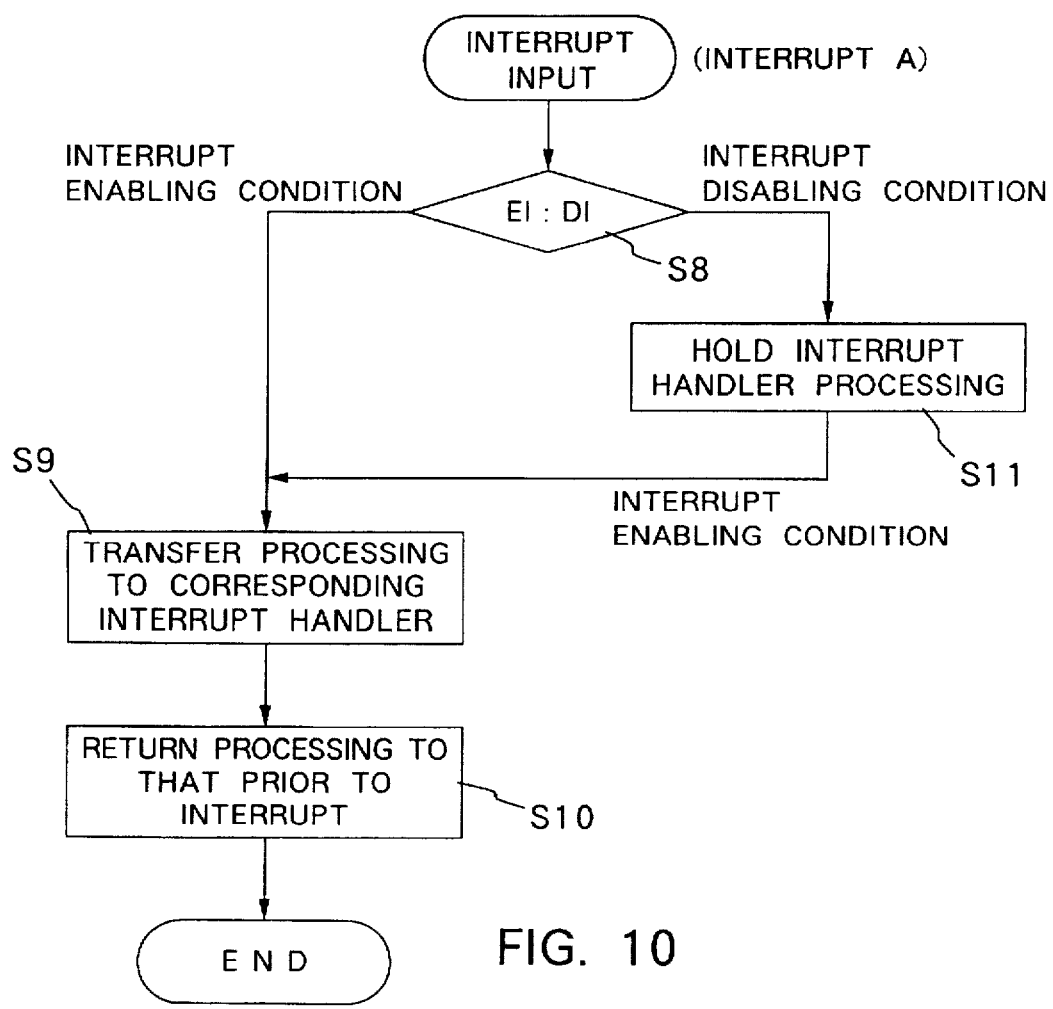
FIG. 10 is a flow chart illustrating processing by the computer system of the second embodiment when an interrupt occurs.

FIG. 10 is a flow chart illustrating the processing when the interrupt A occurs. When the interrupt A is inputted, the processing branches at step S8 depending upon whether the condition of the CPU 13 is the interrupt enabling condition (EI) or the interrupt disabling condition (DI). If the condition of the CPU 13 is the interrupt enabling condition, that is, the interrupt A is not masked at the interrupt mask table 30, then the processing is transferred to the interrupt handler 4 (step S9), and after the processing of the interrupt handler 4 comes to an end, the processing returns to the processing which has been performed prior to the interrupt (step S10), thereby completing a series of processes. On the other hand, if the condition of the CPU 13 is the interrupt disabling condition, that is, the interrupt A is masked by the interrupt mask table 30, the processing of the interrupt handler 4 is held until after the interrupt enabling condition is entered (step S11). After the interrupt enabling condition is entered, the processing is transferred to step S9 described above. After all, processing similar to that performed using the conventional interrupt managing method is performed.

Figure 11:
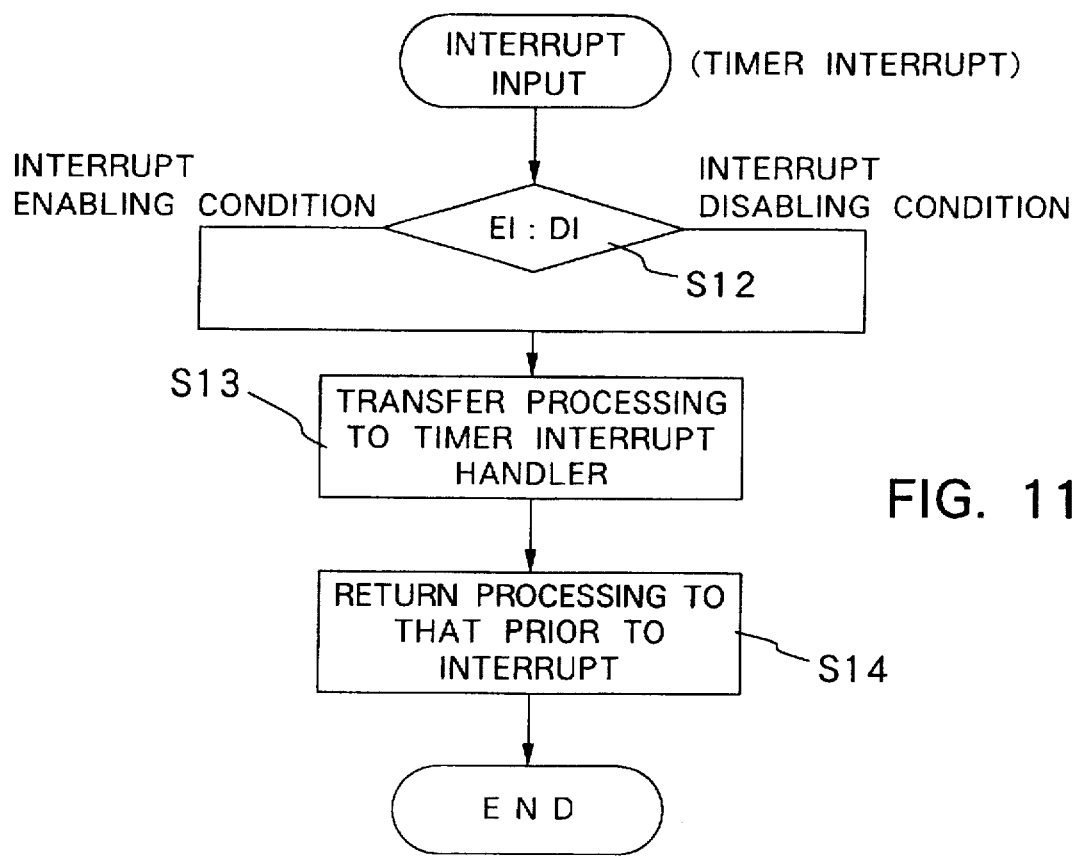
FIG. 11 is a flow chart illustrating processing by the computer system OS of the second embodiment when another interrupt occurs.

Meanwhile, FIG. 11 is a flow chart illustrating the processing when the timer interrupt C is generated. When the timer interrupt C is inputted, branching of the processing depending upon whether the condition of the CPU 13 is the interrupt enabling condition (EI) or the interrupt disabling condition (DI) does not occur as seen from step S12. In any case, the processing is transferred to the timer interrupt handler 21 (step S13), and after the processing of the timer interrupt handler 21 comes to an end, the processing returns to that performed prior to the interrupt (step S14), thereby completing a series of processes. After all, the timer interrupt C is processed without being influenced by the OS.

In the present embodiment, a timer interrupt which has a high degree of urgency is processed without being influenced by the OS. For example, in a system which establishes synchronism of communication based on clocks produced by the timer controller 20, clock interrupts at accurate intervals are essentially required. Also to such a field that attaches importance to the accuracy in interrupt starting interval time, introduction of a real-time OS can be achieved by making use of the present embodiment. Further, where there is the necessity to issue a system call to an OS from within an interrupt handler, operation quite similar to that performed by the conventional interrupt managing method can be performed, and accordingly, the compatibility with conventional systems is maintained.

It is to be understood that variations and modifications of the interrupt managing system disclosed herein will be evident to those skilled in the art. It is intended that all such modifications and variations be included within the scope of the appended claims.

What is claimed is:

1. In a computer system which includes a CPU, wherein resources are managed by a real-time operating system and an asynchronous interrupt to the CPU may occur, an interrupt managing system for said computer, comprising:

managed interrupt storage means in which information regarding interrupts to be managed by the real-time operating system is stored; interrupt disabling processing means for reading out the information stored in the managed interrupt storage means and disabling an interrupt designated by the information in order to perform exclusive control regarding processing in the real-time operating system; and interrupt enabling processing means for enabling the disabled interrupt, wherein interrupts that are not to be managed by the real-time operating system are not disabled by the interrupt disabling processing means, and are executed without delay by the CPU.

2. The interrupt managing system according to claim 1, further comprising:

an interrupt controller connected to the CPU and having a plurality of individually maskable interrupt inputs for transmitting an interrupt to the CPU in response to an input to one of the maskable interrupt inputs which is not masked; and particular interrupt operation means for setting a mask to the interrupt controller corresponding to the interrupt disabled by the interrupt disabling processing means.

3. In a computer system which includes a CPU, wherein resources are managed by a real-time operating system and an asynchronous interrupt to the CPU may occur, an interrupt managing system for said computer, comprising:

managed interrupt storage means in which information regarding interrupts to be managed by the real-time operating system is stored;

interrupt disabling processing means for reading out the information stored in the managed interrupt storage means and disabling an interrupt designated by the information in order to perform exclusive control regarding processing in the real-time operating system;

interrupt enabling processing means for enabling the disabled interrupt;

an interrupt controller connected to the CPU and having a plurality of individually maskable interrupts for transmitting an interrupt to the CPU in response to an input to one of the maskable interrupt inputs which is not masked; and particular interrupt operation means for setting a mask to the interrupt controller corresponding to the interrupt disabled by the interrupt disabling processing means, wherein only information regarding an interrupt in whose corresponding interrupt handler a system call to the real-time operating system is issued is stored in the managed interrupt storage means.

4. The interrupt managing system according to claim 2, wherein the interrupt enabling processing means cancels a mask set to the interrupt controller.

5. The interrupt managing system according to claim 2, wherein the interrupt disabling processing means, the interrupt enabling processing means and the particular interrupt operation means are constructed as individual routines in the real-time operating system.

6. In a computer system which includes a CPU, wherein resources are managed by a real-time operating system and an asynchronous interrupt to the CPU may occur, an interrupt managing system for said computer, comprising:

managed interrupt storage means in which information regarding interrupts to be managed by the real-time operating system is stored;

interrupt disabling processing means for reading out the information stored in the managed interrupt storage means and disabling an interrupt designated by the information in order to perform exclusive control regarding processing in the real-time operating system;

interrupt enabling processing means for enabling the disabled interrupt;

an interrupt controller connected to the CPU and having a plurality of individually maskable interrupts for transmitting an interrupt to the CPU in response to an input to one of the maskable interrupt inputs which is not masked; and particular interrupt operation means for setting a mask to the interrupt controller corresponding to the interrupt disabled by the interrupt disabling processing means, wherein a timer controller which generates a timer interrupt is connected to the interrupt controller, and information regarding the timer interrupt is not stored in the managed interrupt storage means.

7. The interrupt managing system according to claim 6, wherein a system call to the real-time operating system is not issued in a timer interrupt handler corresponding to the timer interrupt.

8. In a computer system which includes a CPU, wherein resources are managed by a real-time operating system and an asynchronous interrupt to the CPU may occur, an interrupt managing system for said computer, comprising:

managed interrupt storage means in which information regarding interrupts to be managed by the real-time operating system is stored;

interrupt disabling processing means for reading out the information stored in the managed interrupt storage means and disabling an interrupt designated by the information in order to perform exclusive control regarding processing in the real-time operating system;

interrupt enabling processing means for enabling the disabled interrupt;

an interrupt controller connected to the CPU and having a plurality of individually maskable interrupts for transmitting an interrupt to the CPU in response to an input to one of the maskable interrupt inputs which is not masked;

particular interrupt operation means for setting a mask to the interrupt controller corresponding to the interrupt disabled by the interrupt disabling processing means, managed interrupt information reception means for storing managed interrupt information received from an application program into the managed interrupt storage means, the managed interrupt information reception means being constructed as an individual routine in the real-time operating systems wherein the interrupt disabling processing means, the interrupt enabling processing means and the particular interrupt operation means are connected as individual routines in the real-time operating system.

9. The interrupt managing system according to claim 8, wherein, upon initialization of the real-time operating system, the managed interrupt information reception means receives and stores the managed interrupt information into the managed interrupt storage means.

10. The interrupt managing system according to claim 1, wherein the interrupts that are not disabled by the disabling processing means correspond to interrupts that do not issue a system call in a respective interrupt handler corresponding to the interrupts.

* * * * *